US012344044B2

(12) United States Patent
Eade et al.

(10) Patent No.: US 12,344,044 B2
(45) Date of Patent: Jul. 1, 2025

(54) TIRE SCANNING DIAGNOSTIC APPARATUS AND SYSTEM

(71) Applicant: Get Spiffy, Inc., Durham, NC (US)

(72) Inventors: Ryan Eade, Durham, NC (US); M. Scot Wingo, Durham, NC (US); Zach Fearnside, Durham, NC (US); Mark Welker, Durham, NC (US); Shannon Kotraba, Durham, NC (US)

(*) Notice: Subject to any disclaimer, the term of this patent is extended or adjusted under 35 U.S.C. 154(b) by 76 days.

(21) Appl. No.: 18/325,060

(22) Filed: May 29, 2023

(65) Prior Publication Data
US 2023/0302855 A1 Sep. 28, 2023

Related U.S. Application Data

(63) Continuation-in-part of application No. 17/534,623, filed on Nov. 24, 2021, now Pat. No. 11,699,225.

(51) Int. Cl.
G06V 10/00 (2022.01)
B60C 11/24 (2006.01)
B60C 25/00 (2006.01)
G06F 3/0488 (2022.01)
G06T 7/00 (2017.01)
G06V 10/147 (2022.01)
G06V 10/70 (2022.01)

(52) U.S. Cl.
CPC .......... *B60C 11/246* (2013.01); *B60C 11/243* (2013.01); *B60C 25/007* (2013.01); *G06F 3/0488* (2013.01); *G06T 7/0004* (2013.01); *G06V 10/147* (2022.01); *G06V 10/70* (2022.01); *G06T 2207/20081* (2013.01); *G06T 2207/30252* (2013.01)

(58) Field of Classification Search
CPC ... B60C 11/246; B60C 11/243; B60C 25/007; G06F 3/0488; G06T 7/0004; G06T 2207/20081; G06T 2207/30252; G06V 10/147; G06V 10/70; G06V 2201/12; G06V 10/143; G06V 20/64; G01B 11/22; G01M 17/027
See application file for complete search history.

(56) References Cited

U.S. PATENT DOCUMENTS 10,063,837 B2 * 8/2018 Zoken ................. H04N 13/221
10,859,468 B2 * 12/2020 Taylor ................. G01M 17/027
(Continued)

Primary Examiner — Frank F Huang

(57) ABSTRACT

The tire sensing and analysis system may comprise a measurement device and local application software. The measurement device may make contact with a tire of a vehicle such that the measurement device is positioned at a specific distance and orientation relative to the tire. The measurement device may capture multiple images of the tire using an RGB camera and a pair of infrared cameras. The local application software may analyze the images and may construct a 3D mesh describing the 3-dimensional contours of the tread. The local application software may determine a tread depth, tread issues, and tire condition and may display status and warning messages on a display unit that is coupled to the measurement device. The measurements may be communicated to remote application software for additional analysis. As non-limiting examples, the remote application software may detect specific tire wear patterns and may transmit a report to share results of the analysis.

11 Claims, 10 Drawing Sheets

(56) References Cited

U.S. PATENT DOCUMENTS

| | | | |
|---|---|---|---|
| 2018/0222499 A1* | 8/2018 | Gomes | G06V 20/52 |
| 2018/0237041 A1* | 8/2018 | Mesher | G06T 7/001 |
| 2019/0113356 A1* | 4/2019 | Fowe | G08G 1/0145 |
| 2019/0285421 A1* | 9/2019 | Johnston | G01C 21/32 |
| 2020/0031281 A1* | 1/2020 | Watanabe | H04N 13/111 |
| 2020/0072631 A1* | 3/2020 | Fowe | G08G 1/052 |
| 2020/0073966 A1* | 3/2020 | Fowe | G06F 16/285 |
| 2020/0158656 A1* | 5/2020 | Chung | G06T 7/0004 |
| 2020/0186778 A1* | 6/2020 | Meyer | H04N 13/189 |
| 2020/0292331 A1* | 9/2020 | Rabel | G06F 16/909 |
| 2020/0349743 A1* | 11/2020 | Kitamura | H04N 7/181 |
| 2021/0146974 A1* | 5/2021 | Wang | H04B 7/0695 |

\* cited by examiner

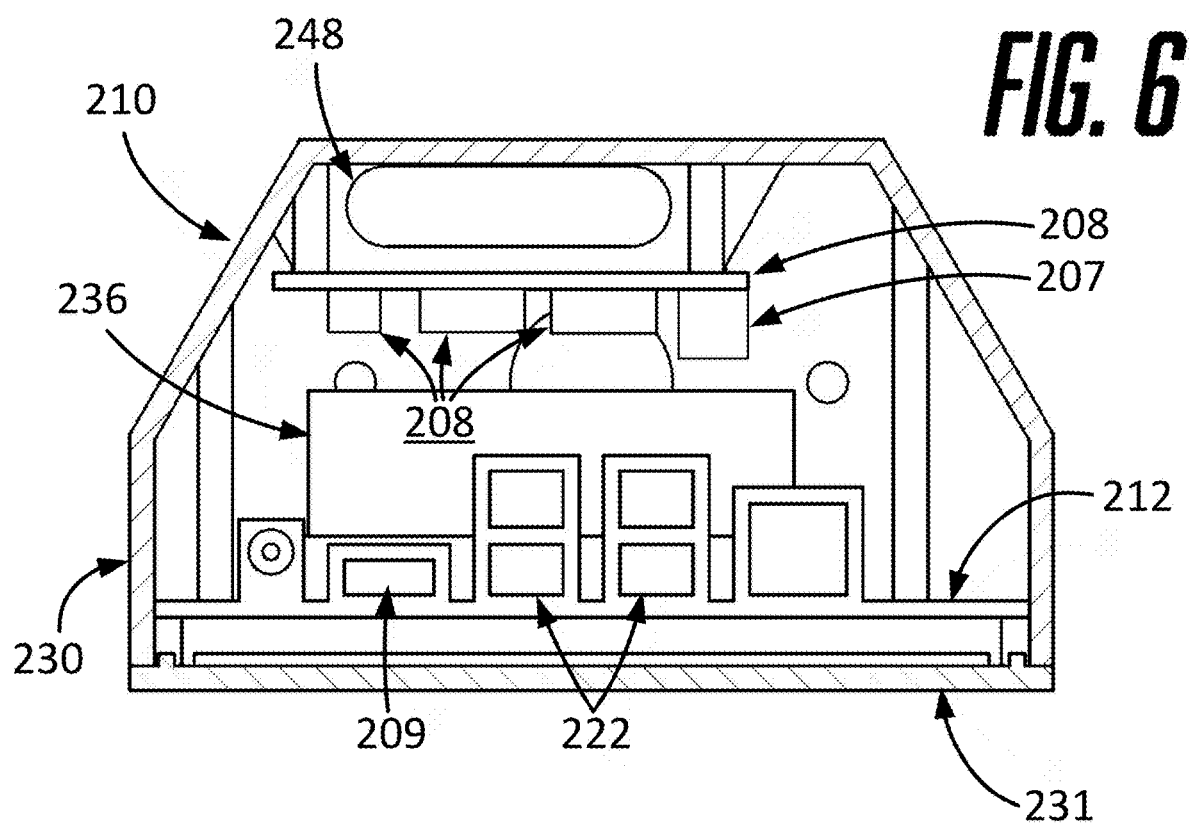
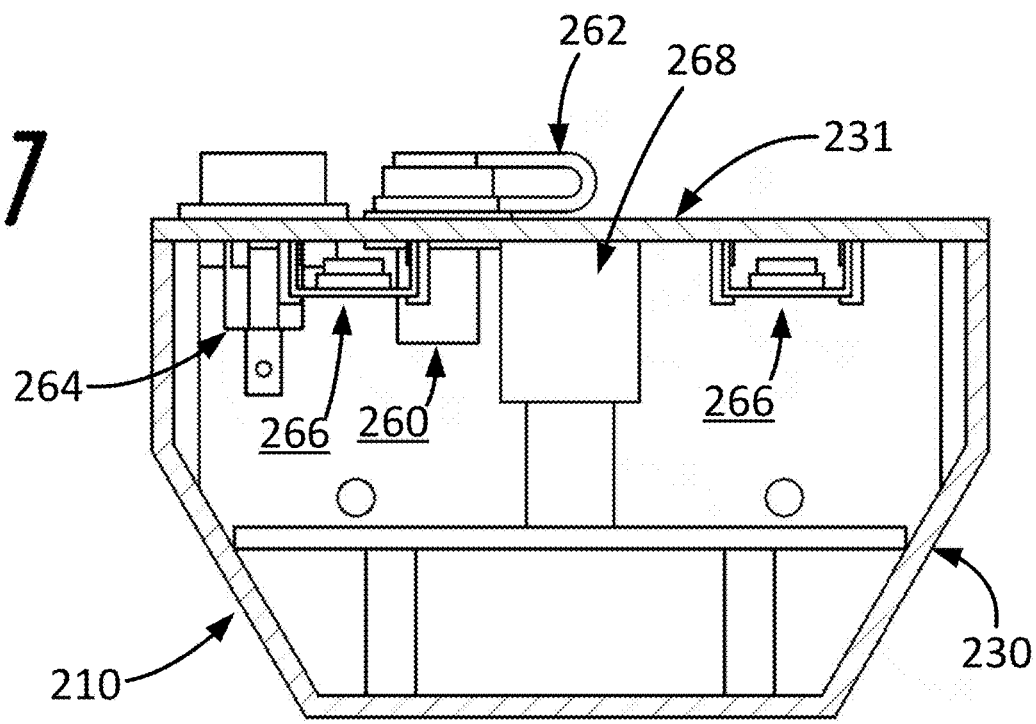

TIRE SCANNING DIAGNOSTIC APPARATUS AND SYSTEM

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

CROSS-REFERENCE TO RELATED APPLICATION

This application claims the benefit of priority to U.S. Non-Provisional application Ser. No. 17/534,623, filed Nov. 24, 2021, entitled "Tire Sensing and Analysis System" which is incorporated by reference herein in its entirety.

BACKGROUND

The tire sensing and analysis system combines hardware and software to solve the problem of accurately, rapidly, and inexpensively measuring and analyzing tire treads for both depth and unusual wear patterns. Based upon the depth of the tread, the invention may suggest that the current tires are unsafe and it is time to purchase new tires. Based upon wear patterns, the invention may suggest specific maintenance actions, changes in driving habits, and/or selection of a different tire. As non-limiting examples, the invention may suggest increasing or decreasing tire pressure in one or more specific tires, gentler braking, or using all-terrain tires.

Tread analysis is performed by a number of currently available systems utilizing software algorithms to provide measurement and condition of the tread. Additional aspects of tire performance and characteristics are often overlooked when analyzing measurements of tire tread depth, wear, and condition.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 6 is a cross-sectional view of the equipment bay looking towards the embedded computer consistent with certain embodiments of the present invention.

FIG. 7 is a cross-sectional view of the equipment bay looking towards the power switch consistent with certain embodiments of the present invention.

DETAILED DESCRIPTION

Figure 1:
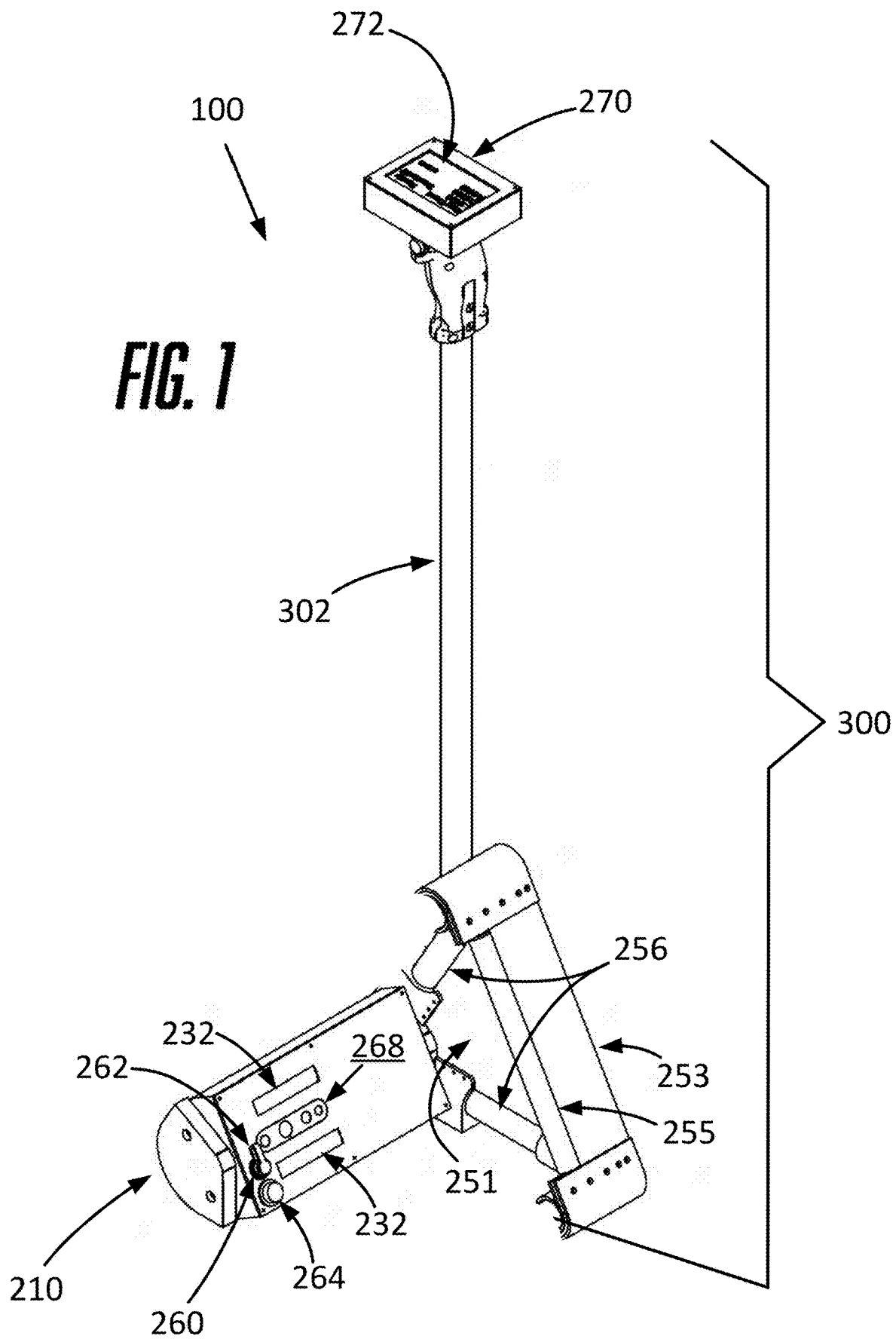
FIG. 1 is an isometric view of the stand-up device consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Goals of the tire sensing and analysis system invention include, but are not limited to, scanning all four tires in less than 3 minutes, operating while off-line which is defined as operating with no network connection, producing precise results with minimal operator training, compatibility with any vehicle having tires with 12 inch to 34 inch diameter, providing real-time feedback to the operator and portable/mobile operation. It is also a goal to provide connectivity such that measurement gathered in the field may be uploaded to a remote computer for storage, cataloging, and post processing when a network becomes available. The invention may comprise a measurement device and local application software. The measurement device may make contact with a tire of a vehicle such that the measurement device is positioned at a specific distance and orientation relative to the tire. The measurement device may capture images of the tire which the local application software may analyze to determine specific measurements and features of the surface of the tire, including tire tread, common features, and anomalous features that may require additional investigation. The measurement device may capture a video stream image of the surface of the tire using an RGB camera with special emphasis on the tread pattern and features of the tire. The measurement device may image the surface in infrared (IR) light using a right IR imager and a left IR imager. The local application software may construct a 3D mesh from the images obtained from the right IR imager and the left IR imager. The 3D mesh may describe the 3-dimensional contours of the tire surface including a tread and other features of the tire surface. The local application software may analyze the captured video image and the 3D mesh to determine a tread depth and measurements for other surface features of the tire. The tread depth and other surface features may be displayed on a flat-screen display of a display unit that is coupled to the measurement device. The measurement device may be quickly moved to other tires of a vehicle to analyze all tires of the vehicle.

The measurement device may comprise an electronics bay, the display unit, a swivel joint, and a contoured grip. The measurement device may utilize a system of visual, audio, and/or tactile feedback that combine to guide the location of the measurement device and correctly position the measurement device near the tire to permit the collection of one or more scans that permit a detailed analysis of the features of the tire tread, sidewalls, connection to the wheel, and other parameters of the tire. In a non-limiting embodiment, the measurement device may include a touch-screen display. The touch-screen display may present a live augmented-reality stream of video capturing the surface and sides of a physical tire. The physical tire is visible within the live augmented-reality video stream with a depth map overlain on the displayed tire for ease of use in guiding the view of the tire being captured in the video display. When in use, the user of the measurement device is provided with additional feedback to ensure that the device is at the optimum distance and position to capture the most detailed video of the tire being examined. The additional feedback may provide the user with indications when the measurement device is too close or too far from the tire, too far to the left or right of the tire surface, and/or tilted or angled incorrectly to capture images at sufficient detail to permit later collection of metrics about the tire(s).

In an embodiment, additional lighting sources may be applied to the surface of the tire during examination to permit the capture of good measurements in low-light conditions. The additional lighting may be in the form of strips of incandescent or fluorescent lights, or may be in the form of individual high intensity Light Emitting Diode (LED) lights having optical lenses to focus and direct the light from the LEDs. The LED lighting may also be controlled by a lighting algorithm that is contained within the measurement device and is in near field communication with the LED lighting component.

The measurement device may contact the tire utilizing the visual/audio/tactile feedback to correctly position the measurement device, capture the images of the tire, and, using the local application software stored within the measurement device, analyze the images.

The electronics bay may comprise an embedded computer, the right IR imager, the left IR imager, one or more LEDs, the RGB camera, and a battery. The embedded computer may comprise a processor, a read-only memory, read/write memory, input/output ports, and one or more communication modules. The one or more communication modules may comprise both near field communication capability such as Bluetooth or BLE and wireless communication capability. The embedded computer may control the overall operation of the invention. As non-limiting examples, the embedded computer may initiate the acquisition of the images from the RGB camera, the left IR imager, and the right IR imager, may analyze the images and perform calculations to determine the tread depth, and may present the results of calculations on the flat-screen display. The processor may execute instructions of a stored program that determine the sequence and timing of the measurement device.

The read-only memory may comprise one or more memory devices that hold the stored program such that the stored program is retained when power is removed from the measurement device. As non-limiting examples, the read-only memory may be Read Only Memory (ROM), Programmable Read Only Memory (PROM), Erasable Programmable Read Only Memory (EPROM), Electrically Erasable Programmable Read Only Memory (EEPROM), Flash memory, or combinations thereof.

The read/write memory may comprise one or more memory devices that hold data and/or programs that may periodically change. As non-limiting examples, the read/write memory may be Random Access Memory (RAM), Static Random Access Memory (SRAM), Dynamic Random Access Memory (DRAM), Flash memory, or combinations thereof. As non-limiting examples, the read/write memory may be used to store the images of the tread and other surface features of a tire, intermediate and final results of calculations, vehicle identification information, operator identification information, or combinations thereof.

In some embodiments, the local application software may be stored within the read-only memory, within the read/write memory, or combinations thereof. In some embodiments, the local application software may be updated by newer versions of the local application software through a communication link with a system server whenever such a communication link is available.

The input/output ports may provide analog and/or digital signal lines that the processor may sense and/or control such that the processor may interact with the invention. As a non-limiting example, the input/output ports may provide the interface necessary for the processor to initiate the video stream image capture and to acquire the video image. In some embodiments, the input/output ports may comprise one or more USB ports that are accessible within the measurement device, accessible from outside of the measurement device, or both.

The one or more communication modules may provide one or more communication interfaces between the processor and devices located outside of the measurement device. In a non-limiting example, the one or more communication modules may comprise a WiFi interface such that the measurement device may wirelessly exchange data and commands with a remote data processor housed within a system server via a computer network. As a further non-limiting example, the one or more communication modules may comprise a near field communication protocol, such as a Bluetooth or BLE interface, such that the measurement device may wirelessly exchange data and commands with the remote system server via a local smartphone, a cellphone network, a computer network, or combinations thereof.

The right IR imager and the left IR imager may be cameras that are sensitive to light in the infrared (IR) portion of the light spectrum. As a non-limiting example, infrared light may be light having a wavelength of 700 nm to 1000 nm. In this non-limiting example, the one or more LEDs and 2 receivers, the right IR imager and the left IR imager, provide the data to build a 3-D model of the surface features of the tire under measurement. This combination of the one or more LEDs and a right IR imager and a left IR imager collects more than 500,000 datapoints about the surface of the tire being measured and analyzed. This collected information provides a very detailed dataset of all of the nuances of the surface features of the tire tread and provides the measurements to calculate depth information for the tire tread of the tire under measurement. This collected dataset also permits the rendering and generation of a 3D image of the tire under measurement. This collected dataset and the 3D image generated permits the analysis of the tire tread and tire surface to determine wear patterns and permits the determination of causes of the discovered wear patterns and tire surface features that may be anomalous.

The right IR imager and the left IR imager may be mounted within an electronics bay enclosure such that the right IR imager and the left IR imager are positioned along an imaginary horizontal line extending parallel to the axis of rotation of the tire and such that the right IR imager is to the right of the left IR imager. The right IR imager may be separated from the left IR imager by an IR imager separation distance which may be measured from the center of the right IR imager to the center of the left IR imager. The IR imager separation distance may be known by the local application software. The one or more LEDs positioned adjacent to the right IR imager and the left IR imager may provide a source of illumination for the right IR imager and the left IR imager. The one or more LEDs may be oriented to illuminate the tread that is being imaged.

Figure 9:
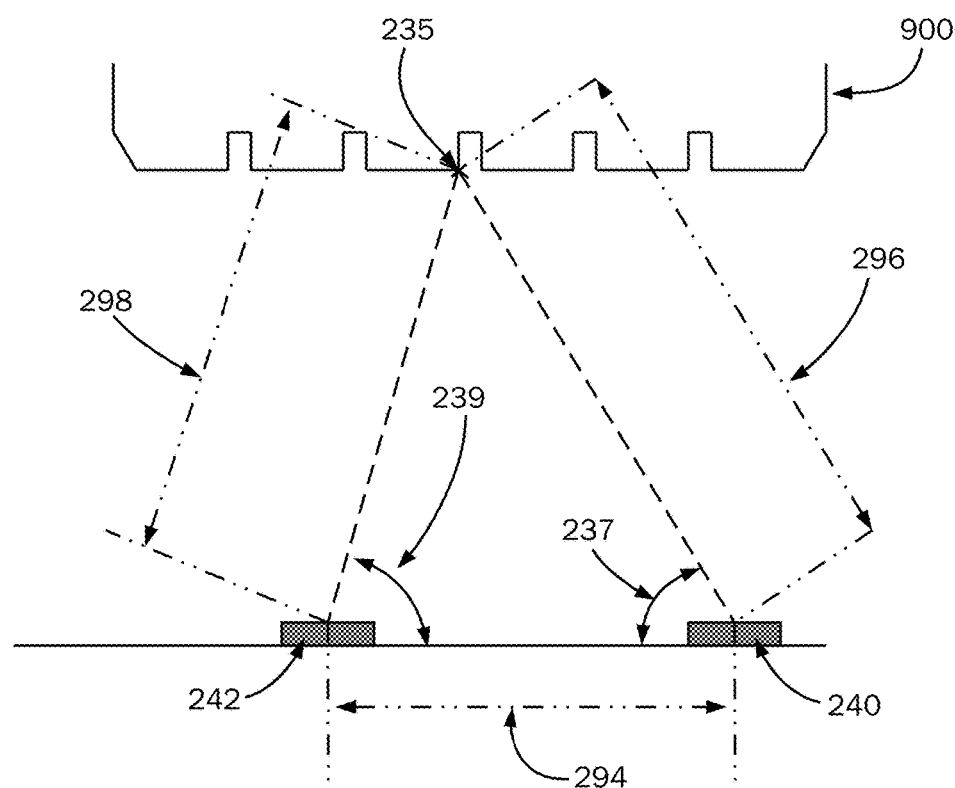
FIG. 9 is a detail view illustrating the determination of distances consistent with certain embodiments of the present invention.

FIG. 9 comprises a top view looking down at the right IR imager, the left IR imager, and a tire to be measured. Because the IR imager separation distance is known and the right IR imager and the left IR imager are oriented to point in parallel towards the tread of the tire being measured, the images captured by the right IR imager and the left IR imager constitute a stereoscopic pair which encode distance information. Specifically, the local application software may be operable to determine a first feature distance from the right IR imager to an identified common feature and may be operable to determine a second feature distance from the left IR imager to a common feature. The common feature is a point on the tread that is visible to both the right IR imager and the left IR imager and which can be uniquely identified in the images taken from both the right IR imager and the left IR imager.

As a non-limiting example, the local application software may be able to apply the geometric Angle-Side-Angle (ASA) postulate to determine the first feature distance and the second feature distance. ASA allows the unknown lengths of two sides of a triangle to be determined if the length of a side and two adjacent angles are known. In this case, the length of one side of the triangle is known to be the IR imager separation distance and the two adjacent angles, a right camera azimuth angle and a left camera azimuth angle, may be determined by the local application software. With these values known, the third angle may be determined by subtracting the right camera azimuth angle and the left camera azimuth angle from 180 degrees. The first feature distance and the second feature distance may be determined by applying the law of sines, per ASA.

The local application software may be operable to determine the right camera azimuth angle based upon the position of the common feature in a right IR image. The local application software may be operable to determine the left camera azimuth angle from the left IR imager to the common feature based upon the horizontal position of the common feature in a left IR image.

The following non-limiting example demonstrates one method that the local application software may determine the right camera azimuth angle from the right IR image. The left camera azimuth angle may be determined from the left IR image in an equivalent manner.

Figure 10:
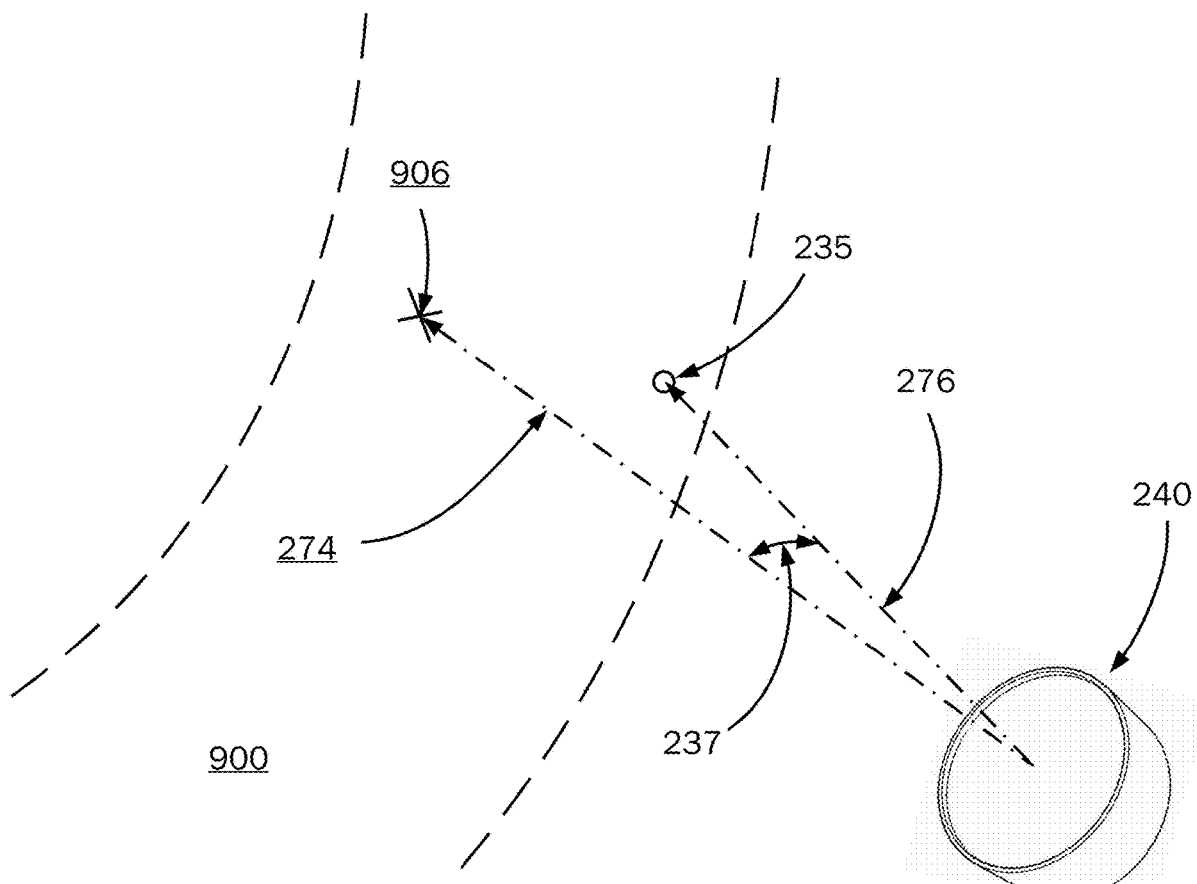
FIG. 10 is a detail view illustrating an azimuth angle between a ray drawn from an imager to a common feature of the surface of a tire and a ray drawn from the imager to an anomalous feature of the surface of the tire consistent with certain embodiments of the present invention.
Figure 11:
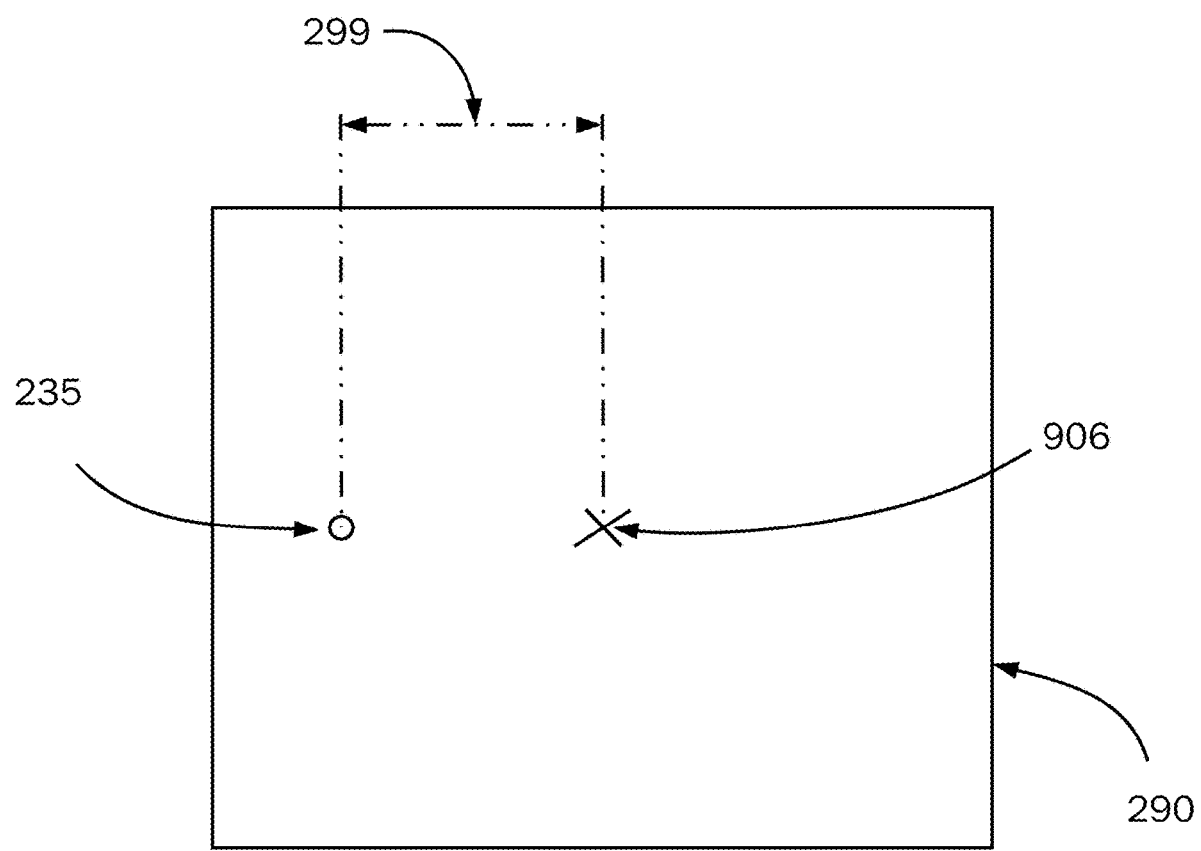
FIG. 11 is a detail view illustrating determination of a separation distance from a captured image consistent with certain embodiments of the present invention.

As shown in FIG. 10 and FIG. 11, a spot on the tire, potentially an anomalous feature, that is directly in front of the right IR imager is represented as an 'X' and the common feature is represented as '0'. The right camera azimuth angle may be the angle formed by two imaginary rays projected away from the right IR imager towards the tire. A first ray may be perpendicular to center of the right IR imager. A second ray may project from the center of the right IR imager to the common feature. If the common feature is directly in front of the right IR imager, then the 'X' and the '0' coincide at the center of the right IR image and the right camera azimuth angle is determined to be 0 degrees. However, if the common feature is to the left of the right IR imager as shown in FIG. 10, then the common feature will appear in the right IR image to the left of center as shown in FIG. 11. The farther to the left the common feature appears in the right IR image, the greater the right camera azimuth angle is. Because the right IR imager is held in a known geometry with respect to the tire by the first distancing arm and the second distancing arm, the local application software may estimate the right camera azimuth angle from a pixel separation distance between the center of the right IR image and the position of the common feature in the right IR image. If the common feature appears to the right of center in the right IR image, then the right camera azimuth angle may be computed to be a negative angle. An analogous analysis of the left IR image may determine the left camera azimuth angle.

In some embodiments, the local application software may use the same technique to determine elevation angles for the common features. The elevation angles may be measured up and down from the right IR imager. In other words, the elevation angles may be measured perpendicular to the azimuth angles.

With the first feature distance and the second feature distance known for the common feature, the local application software may determine a position of the common feature in a three-dimensional coordinate system.

The local application software may determine the first feature distance and the second feature distance for a plurality of the common features dispersed across the tread and may construct the 3D mesh describing the contour of the tread. As a non-limiting example, the 3D mesh may be a data structure that stores a 3D model of the common features. As non-limiting examples, the 3D mesh may be analyzed by the local application software to determine the tread depth, to identify wear patterns, or to identify damage or defects.

The one or more LEDs may comprise individually addressable RGB LEDs, white LEDs, IR LEDs, or any combination thereof that may also have optical lenses to focus and direct light. In some embodiments, the brightness of the one or more LEDs may be under control of the local application software. The individual addressability of the one or more LEDs combined with the ability to control the brightness of the one or more LEDs may enable the local application software to illuminate the surface of the tire using a color and intensity of illumination and optical lenses selected by the local application software to best show details of interest.

The RGB camera may be operable to capture a streaming video image of the tread in the visible light spectrum. In some embodiments, the local application software may use the video image to identify the common features that may form the frame for building the 3D mesh. In some embodiments, the local application software may use the video image as the base for overlaying with graphics, textual messages, or combinations thereof before presenting results to an operator. As a non-limiting example, the local application software may graphically highlight a region of the tread found to be the shallowest along with one or more textual messages conveying the actual tread depth.

The battery may comprise one or more energy-storage devices. The battery may be a source of electrical energy to operate the electronics bay and the display unit. The battery may be replaceable or rechargeable. The electronics bay may further comprise a charging port for recharging the battery. In some embodiments, the charging port may be covered by a weatherproof port cover when not in use. The electronics bay may comprise a power switch that may be operable to energize and deenergize the invention. The power switch and the charging port may be accessible on an electronics bay lid.

The embedded computer, the right IR imager, the left IR imager, and the RGB camera may be packaged on one or more circuit boards housed within the electronics bay enclosure. One or more windows on the front of the electronics bay enclosure may provide a visual pathway between the tire and the right IR imager, the left IR imager, the one or more LEDs, or any combination thereof. The one or more windows may be transparent to IR and visible light.

In and embodiment, the measurement device may permit the RGB camera, imagers, and/or the body of the measurement device to be rotated at an angle relative to the tire. The RGB camera and imagers may rotate and/or translate to capture both sides of a tire, or additional portions of the tire. The RGB camera may provide the ability to capture still images from the video stream. These still images may permit the system to gather additional manufacturing information available on the surface of the tire. This additional information may consist of manufacturing date, manufacturer, tire dimensions, tire class or ratings. The system may use depth data and/or captured photos of the sides of a tire to determine such conditions as damage to the side of a tire such as the presence of heat rings.

The system may also take photos of license plate information and optionally decode the license plate to be able to register said tire measurements and tire data directly to a vehicle. This analysis and data capture allows for a mapping of historical data to be tired to a particular vehicle. The system may also capture video data to decode the VIN number for a vehicle, where this information may be used to determine what vehicle is being scanned and determine if the correct tires are being used on the vehicle. The measurement device may also take photos and perform depth mapping of the side of the vehicle or underbody of the vehicle to provide additional information about damage to the vehicle. This analysis and data capture may create a more comprehensive view of the condition of the vehicle being scanned for inspection purposes. The system may also map the location of the measurement device as it is moved around a vehicle using the camera, imagers, or an IMU. This data could be used to automatically classify which tire a scan belong to or be used to corrected a mis-classified tire.

In performing analysis and creating metrics for the vehicles and tires being scanned, the measurement device is active to obtain certain classes of information and data. This data capture may include data about the tread-depth and remaining lifespan of the tire, additional manufacturing data about the tire, license plate of the vehicle on which the tire is installed, and/or data about damage or condition of the rest of the vehicle, such as, in non-limiting examples, side panels and/or the underbody of the vehicle. The measurement device analyses the data and makes any immediate recommendations to the operation and/or technician using the vehicle information as applicable. The measurement device relays the captured and created data to servers associated with the measurement device through an internet connection on the device or through a mobile application that can capture and transmit the captured data using the cellular network of a mobile device such as a smart phone, ipad, cellular phone, or other mobile device.

In an embodiment, system installed on one or more servers supporting the measurement device may analyze the data, uses the recommendations from the device, and/or uses historical data from previous scans by the measurement device of that tire at different timepoints to determine an appropriate recommendation to the owner, maintainer, or lessor of the vehicle being scanned. In a non-limiting example, these recommendations may communicate messages to the effect of immediate replacement of the scanned tire, warn that a tire needs to be replaced in a certain number of days or months, warn that tires need to be rotated, warn that a tire has a nail or foreign lodged in the tire, warn that the vehicle has other potential problems, or warn that a vehicle needs an alignment or has suspension issues or needs a more thorough inspection for frame damage.

The display unit may house the touch-screen display. The touch-screen display may be electrically coupled to the embedded computer and may be operable to report operational status of the electronics bay in the form of a system status report as determined by the stored program in the embedded computer and/or results of computations performed by the local application software. As non-limiting examples, the touch-screen display may be a color or monochrome display based upon Liquid Crystal Display (LCD), Light Emitting Diode (LED), Organic LED (OLED), or Organic LCD (OLCD) technologies. The touch-screen display may present graphical information, textual information, or both. As non-limiting examples, the touch-screen display may report the operational status of a low battery condition or the display may present to the user the tread depth of the tire.

A trigger may be embedded within the display on the touch screen display of the device and may be operable to initiate an operation when activated by the operator. In a non-limiting example, the trigger may initiate the capture of data points that permit the creation of video images and 3D models of the surface of one or more tires. The collected data points provide for the creation of images of the tire surface and permit an analysis of the tread depth and surface features of the tire being imaged when one or more analytic algorithms are utilized by the local measurement application to create one or more results display images. The display images created by the local measurement application may be displayed as results on the flat-screen display visible to the user when activated by the user.

The swivel joint may be a mechanical hinge that is operable to change the viewing angle of the flat-screen display. In some embodiments, the swivel joint may permit the viewing angle of the flat-screen display to be changed when pressure is applied and may hold the viewing angle of the flat-screen display when pressure is released. As a non-limiting example, the swivel joint may comprise a friction fit between movable elements which may be overcome by the application of pressure.

The contoured grip may be a shaped grip adapted to be held by the operator while operating the invention.

In some embodiments, the invention may be packaged as a stand-up device. A stand-up device as used herein is a device that may be used to perform the data collection of surface features of a tire while the operator or user stands upright utilizing an extended handle and activating the device using the trigger shown on the touch-screen display. The stand-up device may be intended for use with a vehicle that is on the ground. The first distancing arm of the stand-up device may rest on the ground with the second distancing arm suspended above the first distancing arm at a known distance and angle from the first distancing arm. The stand-up device may be used by sliding the first distancing arm and the second distancing arm to bring each of the distancing arms into contact with the surface of the tire such that the first distancing arm touches the tire and the ground and the second distancing arm touches the tire only. The stand-up device may fit between the tire and a wheel well of the vehicle when in position to perform a data collection action. The stand-up device may collect data from the rear-facing tire surface or from the front-facing tire surface and may be moved into position at the front or the rear of the tire to support these data collection operations.

The stand-up device may comprise an extended handle that elevates the display unit. A lower end of the extended handle may couple to the swivel joint located on a side of the electronics bay. The upper end of the extended handle may couple to the contoured grip. The bottom surface of the display unit may be coupled to the upper end of the extended handle.

The swivel joint on the stand-up device may pivot forward and rearward to present the flat-screen display to the operator. In a preferred embodiment, the swivel joint may pivot through 120 degrees+/−10 degrees so that the invention may be positioned to scan the tire from the front-facing surface of the tire or from the rear-facing surface of the tire.

In some embodiments, the invention may be packaged as a hand-held device. The hand-held device may be intended for use with the vehicle that is raised off of the ground by a lift.

The contoured grip of the hand-held device may be coupled to the bottom of the electronics bay such that the hand-held device is adapted to be held in the air by the operator with the first distancing arm and the second distancing arm in physical contact with the surface of the tire of the vehicle. The display unit may be coupled to the contoured grip facing the operator via the swivel joint. The swivel joint may be operable to tilt the display unit up and down to present the flat-screen display to the operator.

In some embodiments, the local application software may be packaged with the stored program of the embedded computer which handles initializing, self-testing, and I/O operations of the electronics bay and the display unit. In an embodiment, the local application software may be operative to collect data points from the video image and the 3D mesh and to store the data points in an electronic data storage element in the hand-held or stand-up device.

In an embodiment, the local application software may monitor the trigger of the device as an activation element to determine when the operator wishes to initiate an action. When the user selects activation by pressing the trigger position shown on the touch-screen display, the local application software energizes the one or more LEDs and acquires the images from the right IR imager, the left IR imager, and the RGB camera as data points to be stored in the local electronic storage element of the device. The local application software may utilize one or more embedded algorithms to analyze the images to detect the common features, determine positions of the common features in three dimensions, and define the 3D mesh representing the tread on the tire. The local application software may determine the tread depth and other surface features, including the common feature, and may report the tread depth and associated warnings, alerts, and information.

The local application software may take the video image and 3D mesh and may use the video image to first align the images perfectly to get a representative view of a perpendicular slice of the exterior surface of a tire. The 3D data may be down-sampled and may be used to identify the treads of the tire and any additional surface features across the perpendicular slice of the surface of the tire. Subsequent to the identification of the tread portions of the tire surface, the local application software may go to the full-resolution detailed data to determine the tread depth using the non-tread area compared to the tread areas. The local application software may then resolve further to a millimeter calculation of absolute and comparative tread depth.

The local application software may establish a communications link to remote application software residing on a remote computer by utilizing the WiFi interface and/or a Bluetooth interface if and when they become available and a connection is established. The local application software may transmit data regarding the tires that the invention has scanned since the last communication session. As non-limiting examples, the data transmitted to the remote application software may comprise identification information for the vehicle and the operator, the date, time, and location of the scans, the images captured, the 3D mesh that was created, the results of analysis performed by the local application software, or any combination of this information. In some embodiments, the remote application software may be cloud-based.

In some embodiments, the local application software may receive software updates from the remote application software. Upon receipt of the updated information from the local application software, the remote application software may catalog and store the received information so that the remote application software may build a history associated with the vehicle. During further processing, if requested by a user or in accordance with established procedure, the remote application software may further analyze the received data. As a non-limiting example, the remote application software may analyze the images to determine whether tread wear patterns are present and, if so, the remote application software may determine whether the tread wear patterns are suggestive of issues other than typical wear and tear on the surface of the tire(s). The additional analysis may detect characteristic wear patterns indicative of poor driving habits, vehicle maintenance issues, defective tires, or other situations. The remote application software may look at a wider slice of the tire and use machine learning to train the system to identify common problematic tread wear patterns that can indicate tire and suspension problems.

In some embodiments, the local application software may be configured to report various conditions of the tire based upon an analysis of the surface of the tire. One such condition, in a non-limiting example, may be an unsafe operational condition of the tread or be based upon discovered surface conditions that may cause unsafe operation of the tire if not corrected. If the local application software determines that an unsafe condition exists for one or more of the tires, a "red zone" warning may be presented on the flat-screen display. A "red zone" warning may be pre-configured for numerous tread and/or surface features that may indicate the unsafe operation of a tire. In a non-limiting example, an unsafe condition that may result in a "red zone" warning may include determination that the tread depth of one or more of the tires is below a minimum safe depth.

In a non-limiting example, the following is a non-exhaustive list of some of the common problems that humans identify with tire tread that may be discovered and identified by the system:

Toe wear or feathered edges—Improper toe alignment
Camber wear—Improper camber alignment
Center wear—Tire over inflated
Edge wear (inside or outside)—Tire under inflated
Patch wear—Tire out of balance
Cup Wear—Bent or worn out suspension component
Brake skid damage—Check brakes, driving behavior
Chunking—vehicle driving on rough surfaces—Change tire type
Stone retention/drilling—Vehicle tread too large for conditions
Spin damage—Excessive vehicle acceleration, rotate tires more frequently
Heel wear—Maintenance problem, not rotating tires frequently enough.

Upon discovery each of these common problems may be identified and communicated to the technician performing the tire scan.

The machine learning system works by training the system on these common problematic wear patterns so that the system can identify them easily from the data captured by the tire scans. In many cases, the invention may be able to detect the earliest signs of problematic tire wear—at a point even before the human eye could detect the wear—while it is not too late to take corrective action.

As a non-limiting example, the remote application software may determine a trend line for the tread depth of each of the tires over time and may be able to predict remaining tire life based upon the history of the tread depth and possibly based upon the make and model of the tire being scanned. Because the vehicle may be serviced 2 to 6 times per year, a courtesy scan of the tires may be performed using the invention at each service event. Once two or more tread depth datapoints are available, predictive analytics may be able to establish the trend line. All tires are sold with a Uniform Quality Grade Standard (UTQG) as set by the DOT and NHTSA and indicate how many miles a tire will last. Using predictive analytics, the remote application software may alert the consumer if their tread wear, based on the multiple scans and, possibly, on the make and model of the tire, is trending at/below/above this threshold.

Additionally, in coordination with human analysts, the machine learning algorithm may identify tread wear patterns and other surface features that are less common but may be indicative of unusual or non-common problems that may need to be addressed. In a non-limiting example, the machine learning algorithm may identify a surface feature or wear pattern that does not match any pre-configured pattern or issue available to the machine learning algorithm. The system may flag these images and transmit the information to a human analyst. Upon receipt, the human analyst may input a definition of the cause of the surface feature or wear pattern identified, if known, or may flag the particular image file with a tag indicating that image requires further study. In this manner, such surface features or wear patterns that may indicate a non-common mechanical or use issue may be identified and included in future image analysis.

Additional recommendations may be sent to the operator or user through direct communication with the operator or user utilizing email or text messages. Optionally, any recommendation could be sent through a partner network and rebranded to the end-customer through mobile phone application, email, or text messages. The recommendation could then be followed by a request to the end-customer to approve correction action for the issue and permit the system to schedule a time for the corrective action and present payment options for the correction. Upon signed approval and payment by the end-user, the corrective action is performed.

In some embodiments, the remote application software may create a report that is specific to the vehicle. The report may comprise the make and model of the tire scanned, the history of the dates when scans of the tires were made, the tread depth of each of the tires on those dates, the results of a predictive tread wear analysis, results of the tread wear patterns analysis, the identification of unexpected or unusual surface features, or any combination thereof. The report may be provided to the owner of the vehicle in the form of printed mail, email, text messaging, or any combination.

While the above description has suggested that some software functions are performed locally by the local application software and some software functions are performed remotely by the remote application software, those skilled in the art will recognize that certain software functions may be performed by either the local application software or the remote application software and that the decision to implement the software functions within the local application software or within the remote application software may include factors such as processor speeds, available memory, communication reliability and transfer speeds, and even marketing considerations.

Turning now to FIG. 1, this figure illustrates an isometric view of a stand-up device 300. The invention 100 may capture images of a tire which local application software may analyze to determine specific measurements and features of the surface of the tire, including tire tread, common features, and anomalous features that may require additional investigation. An electronics bay 210 may be centrally located with an extended handle 302 extending up to a display unit 270. The display unit 270 may comprise a flat-screen display for reporting status, the results of tire tread analysis, and other information. A trigger incorporated into the touch-screen display may be used to initiate operations. The electronics bay 210 may comprise a camera assembly 268, one or more windows 232 covering illumination sources, a power switch 264, a charging port 260, and a weatherproof port cover 262 over the charging port 260. A side shade panel 251, a front shade panel 253, and a soft light barrier 255 may reduce interference from ambient light sources.

Figure 2:
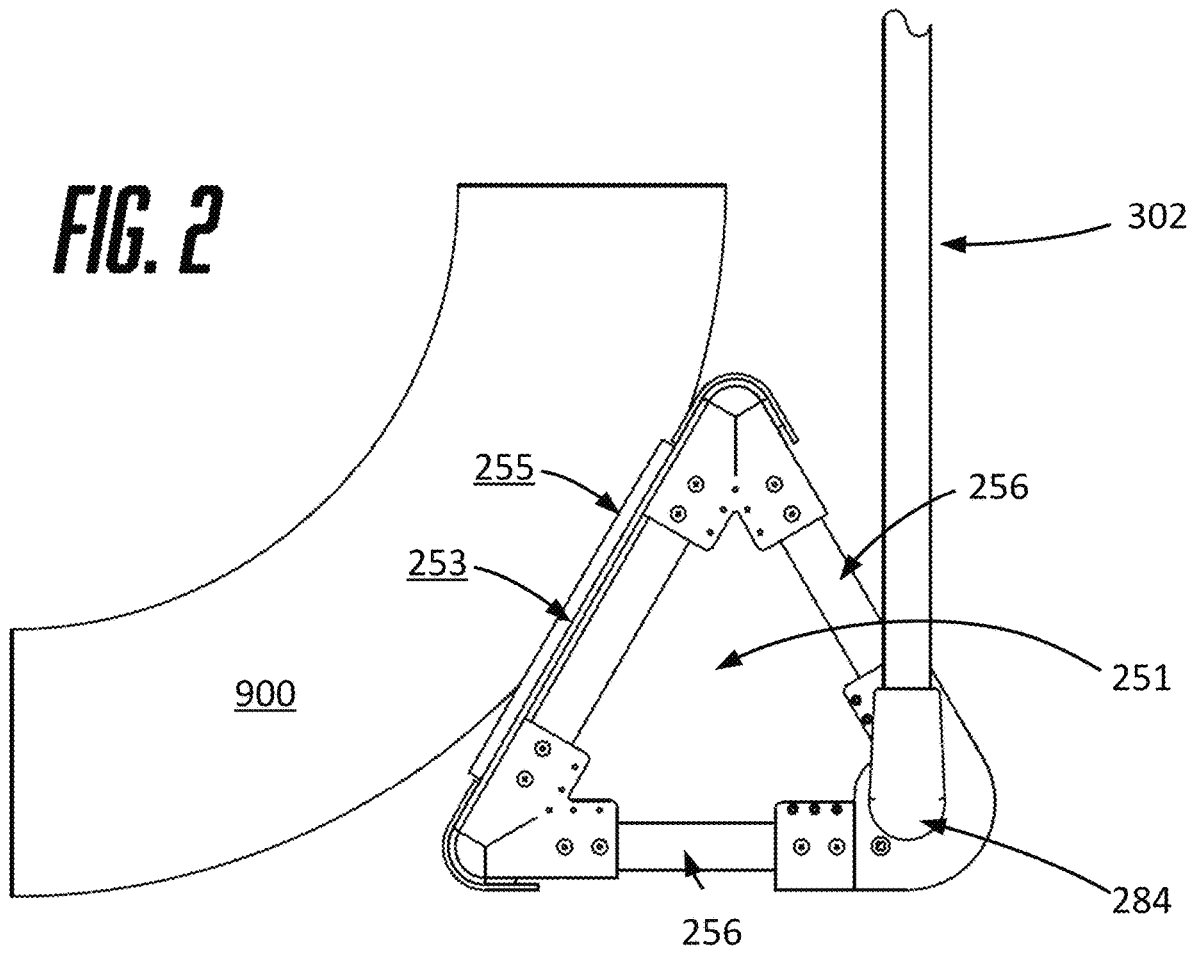
FIG. 2 is a side detail view of the stand-up device consistent with certain embodiments of the present invention.

Turning now to FIG. 2, this figure illustrates a side view of the stand-up device positioned to image and analyze a tire 900. The device is placed against the tire 900 so that the system can factor in the predetermined orientation and distance to the tire 900 from the electronics bay. An extended handle 302, which leads up to a display unit at the top of the extended handle 302, may pivot at a swivel joint 284 to change the viewing angle of the display if desired. A side shade panel 251, a front shade panel 253, and a soft light barrier 255 may reduce interference from ambient light sources.

Figure 3:
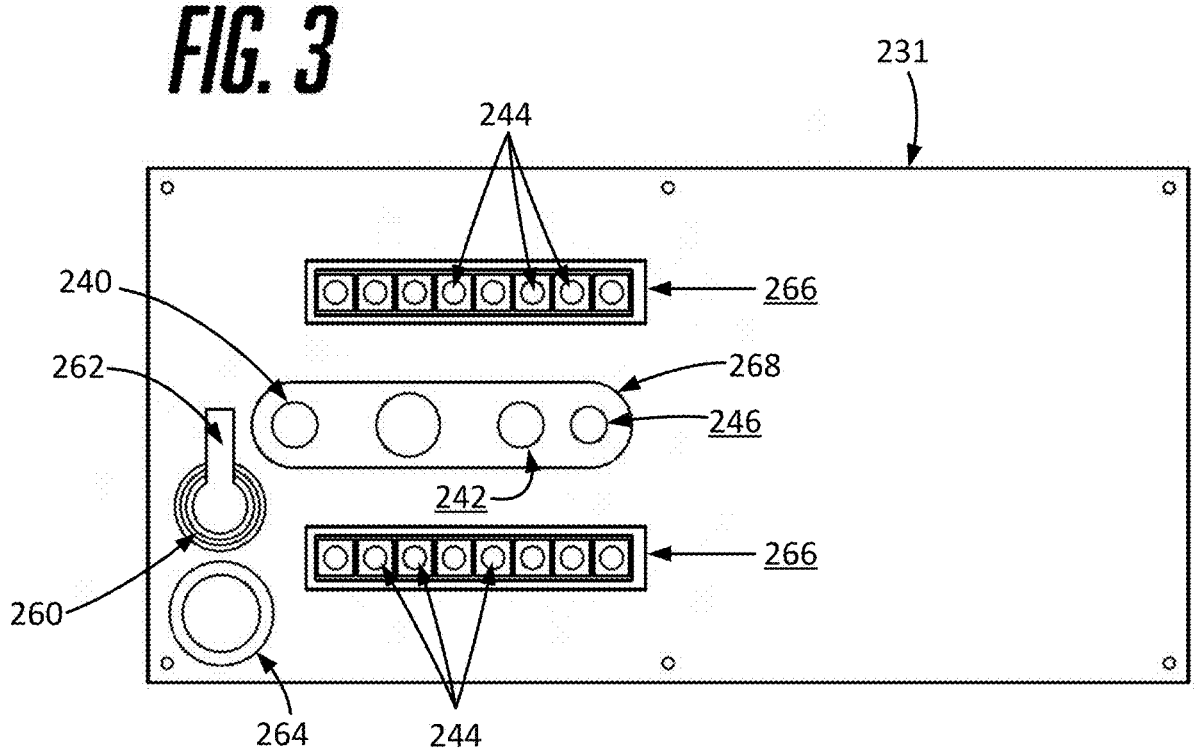
FIG. 3 is a detail view of the electronics bay lid consistent with certain embodiments of the present invention.

Turning now to FIG. 3, this figure illustrates an electronics bay lid 231. LED assemblies 266 comprising one or more LEDs 244 may be positioned above and below a camera assembly 268. The camera assembly 268 may comprise a right IR imager 240, a left IR imager 242, and an RGB camera 246 which may capture images which are analyzed by local application software. A power switch 264 may be accessible on the electronics bay lid 231, along with a charging port 260 that may be covered by a weatherproof port cover 262 when not in use.

Figure 4:
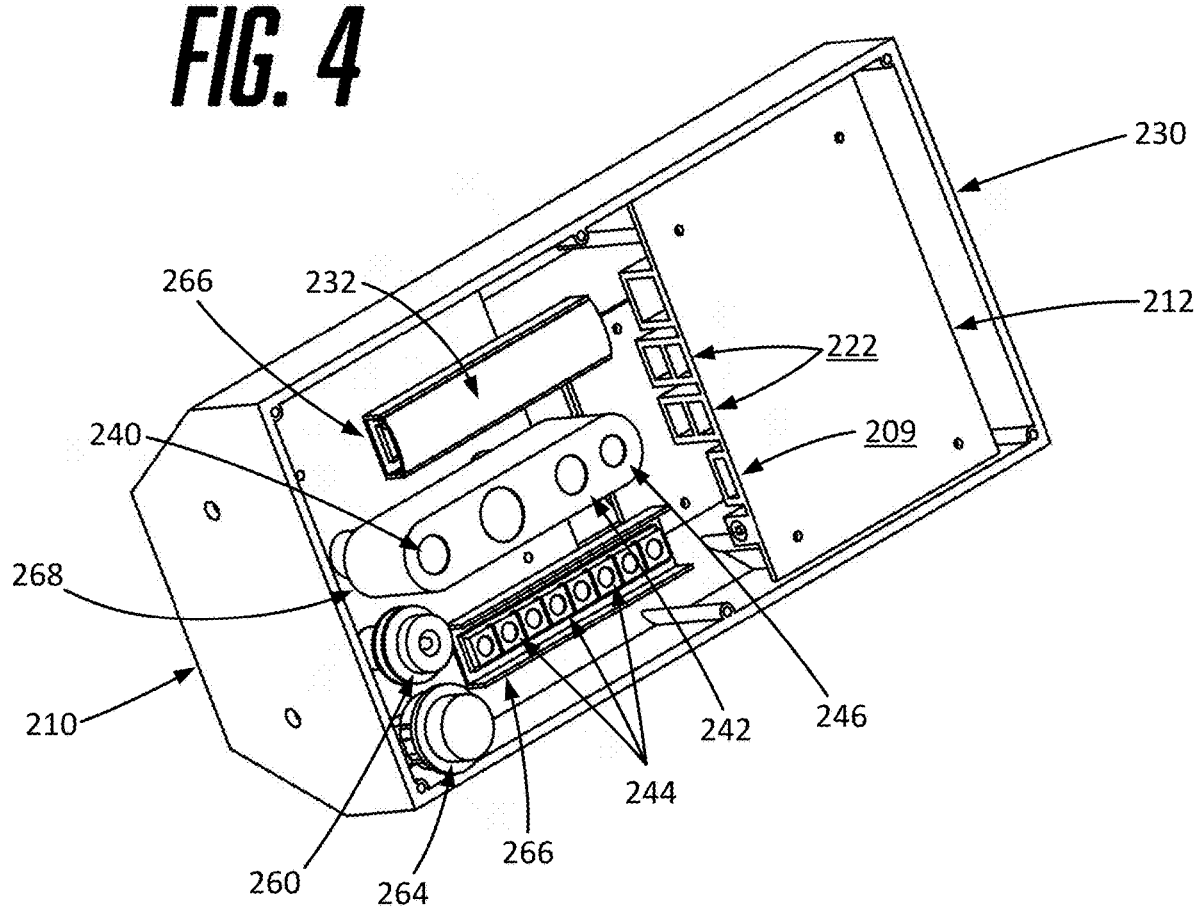
FIG. 4 is a detail view of the enclosure bay with the electronics bay lid removed consistent with certain embodiments of the present invention.

Turning now to FIG. 4, this figure illustrates an isometric view of an electronics bay 210 with the electronics bay lid removed. An electronics bay enclosure 230 may house an embedded computer 212, a camera assembly 268, a power switch 264, LED assemblies 266, and a charging port 260. The embedded computer 212 may comprise one or more USB ports to electrically coupling to devices and a display I/O port 209 for communicating with the display unit. The camera assembly 268 may comprise a right IR imager 240, a left IR imager 242, and an RGB camera 246 for capturing images of the tire. The LED assemblies 266 may provide illumination for imaging. In FIG. 4, the upper LED assembly is shown with a window in place and the lower LED assembly is shown with one or more LEDs 244 uncovered.

Figure 5:
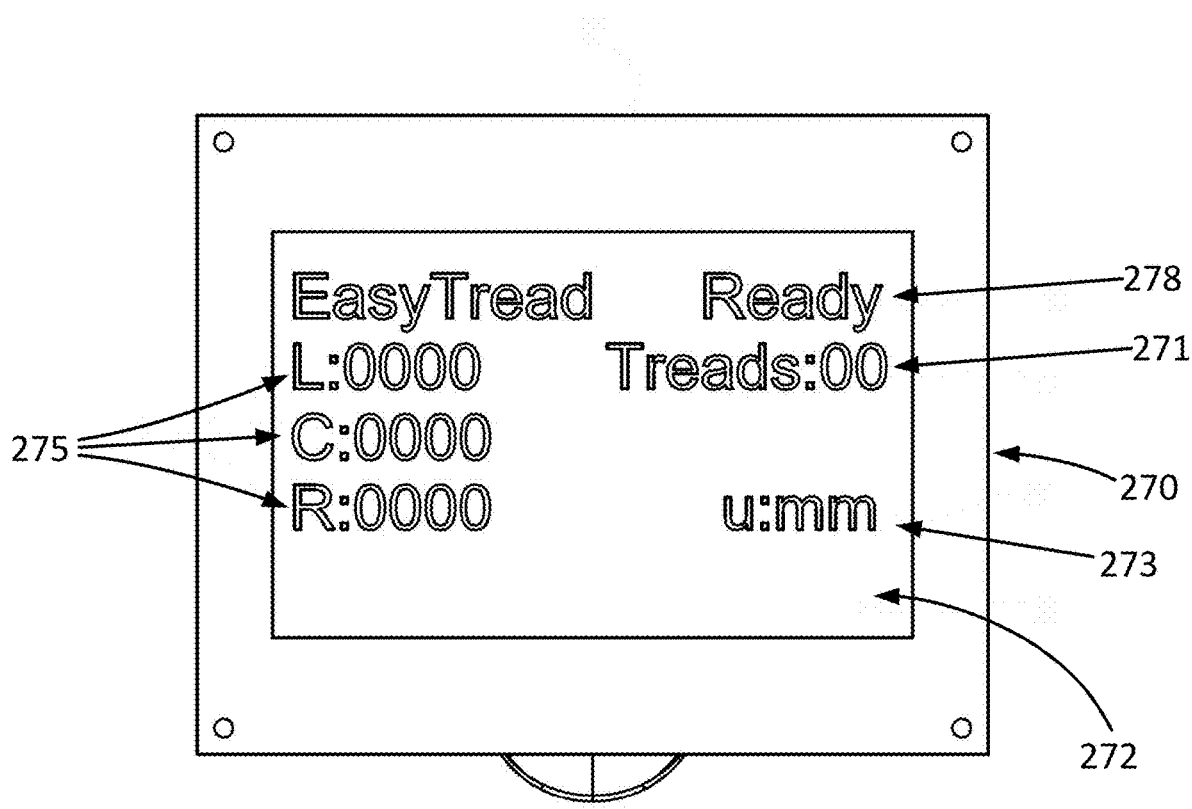
FIG. 5 is a detail view of the top of the display unit consistent with certain embodiments of the present invention.

Turning now to FIG. 5, this figure illustrates the top of a display unit 270. A flat-screen display 272 may present visual results to the operator. As a non-limiting example, the flat-screen display 272 may present calculated tread depths 275, a system status report 278, results of a tire scan 271, and a measurement unit 273.

Turning now to FIG. 6, this figure illustrates a cross-sectional view of an electronics bay 210 looking towards an embedded computer 212. The embedded computer 212 may be housed between an electronics bay enclosure 230 and an electronics bay lid 231. The embedded computer 212 may execute local application software to capture images, analyze the images, report the results of the analysis, and communicate with a remote server. The embedded computer 212 may comprise a processor and heatsink 236, one or more USB ports to electrically coupling to devices and a display I/O port 209 for communicating with the display unit. A power and peripheral management board 288 may comprise GPIO breakout connectors 208 for electrically coupling to subsystems within the electronics bay 210 and a piezoelectric sound transducer 207 for sounding audible alarms. A battery 248 may be a source of electrical energy to operate the electronics bay 210 and the display unit.

Turning now to FIG. 7, this figure illustrates a cross-sectional view of an electronics bay 210 looking towards a power switch 264. The power switch 264, a camera assembly 268, LED assemblies 266, and a charging port 260 may be housed between an electronics bay enclosure 230 and an electronics bay lid 231. The LED assemblies 266 may provide illumination during imaging. The camera assembly 268 may be operable to image the tire under the control of local application software. A weatherproof port cover 262 may cover the charging port 260 to protect the charging port 260 from exposure to rain, snow, dew, splashes, and other source of moisture.

Figure 8:
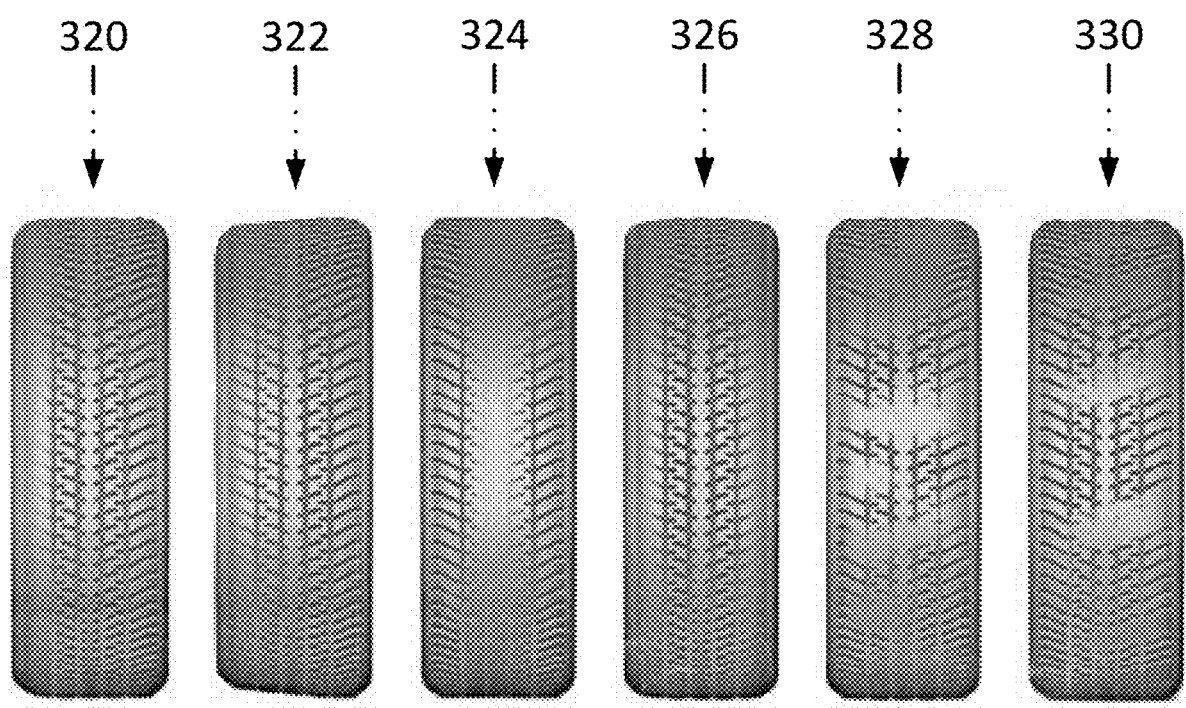
FIG. 8 is an illustration of six tire wear patterns consistent with certain embodiments of the present invention.

Turning now to FIG. 8, this figure illustrates non-limiting examples of tires exhibiting different and distinct wear patterns. Analysis of the tire surface imagery may identify a specific wear pattern and may suggest a cause of the wear pattern. As non-limiting examples, toe wear 320 and camber wear 322 make indicate alignment problems, center wear 324 may indicate over inflation, edge wear 326 may indicate under inflation, patch wear 328 may indicate that the tire is out of balance, and cup wear 330 may indicate suspension issues.

Turning now to FIG. 9, this figure illustrates how a first feature distance 296 and a second feature distance 298 may be determined. An IR imager separation distance 294 between a right IR imager 240 and a left IR imager 242 is known due to the design of the electronics bay. A right camera azimuth angle 237 and a left camera azimuth angle 239 may be deduced from the position of a common feature 235 of a tire 900 on images captured by the right IR imager 240 and the left IR imager 242. With the length of a triangle's side, the IR imager separation distance 294, and the measure of two adjacent angles, the right camera azimuth angle 237 and the left camera azimuth angle 239, known, the lengths of the other sides, which are the first feature distance 296 and the second feature distance 298, may be calculated by applying Angle-Side-Angle.

Turning now to FIG. 10, this figure illustrates that a right camera azimuth angle 237 between a common feature 235 on the surface of a tire 900 and an anomalous feature 906 on the surface of the tire 900 is measured as the angle between a first ray 274 running from a right IR imager 240 to the anomalous feature 906 and a second ray 276 running from the right IR imager 240 to the common feature 235. The right camera azimuth angle 237 corresponds to a pixel separation between the common feature 235 and the anomalous feature 906 on images captured by the right IR imager 240. A left camera azimuth angle may similarly be calculated from images captured by the left IR imager.

Turning now to FIG. 11, this figure illustrates a non-limiting example of a right IR image 290 captured by the right IR imager in FIG. 10 and shows a pixel separation distance 299 between a common feature 235 and an anomalous feature 906. The pixel separation distance 299 measured in pixels may correspond to the actual distance between the common feature 235 and the anomalous feature 906. Using this technique, the positions of a plurality of features on the surface of the tire may be determined. Combined with similar positioning obtained using the left IR imager, local application software may estimate the location of each feature in 3-dimensional space.

While certain illustrative embodiments have been described, it is evident that many alternatives, modifications, permutations and variations will become apparent to those skilled in the art in light of the foregoing description.

We claim:

1. A device for data collection and analysis of a vehicle tire, comprising:
a handle configured to support a camera and one or more illumination panels;
an electronic touchscreen display panel;
said camera and one or more illumination panels oriented to capture one or more images of a tire surface when the scan operation is initiated;
said touchscreen display panel providing a view of the said one or more images of the tire surface captured as live images;
said captured one or more images of a tire surface stored within an electronic storage element within said device and transmitted from said device to a data processor external to said device;
said device in data communication with an application software module within said data processor controlling LED light assemblies, capturing said one or more images of a tire surface, analyzing said captured tire surface images, overlaying said analysis on said images as graphics and text information of tire surface metrics to create result images, and presenting said result images on said electronic touchscreen display panel;

said captured one or more images of a tire surface and determined plurality of tire metrics displayed to a technician on said electronic touchscreen display panel.

2. The device of claim 1, where said illumination panels comprise individual high intensity LED lights.

3. The device of claim 2, where said high intensity LED lights further comprise optical lenses to focus and direct generated light from said LED lights.

4. The device of claim 1, where said device further comprises one or more sensors.

5. The device of claim 4, where said sensors are configured to capture tread depth, tire data, and additional metrics about a tire or a vehicle associated with said tire.

6. The device of claim 5, where said LED light assemblies comprise RGB LED lights, white LED lights, IR LED lights, or any combination thereof.

7. The device of claim 1, where said device transmits tire conditions, vehicle information, and/or recommendations for repair, replacement, cautionary, or informational data to a user of said device.

8. The device of claim 7, further comprising a wireless communication capacity to exchange data and commands with an external system server utilizing a smartphone, a cellphone network, a computer network, or combinations thereof.

9. The device of claim 1, where said electronic touchscreen display panel further comprises displaying control information, operational status, or other system information in addition to image information.

10. The device of claim 1, where the device further comprises a swivel joint operable to change the viewing angle of said electronic display.

11. The device of claim 1, where the application software module further comprises a machine learning system to train the device on common and repeatable operations.

* * * * *